(12) United States Patent
Bouquoyoue et al.

(10) Patent No.: US 8,362,160 B2
(45) Date of Patent: Jan. 29, 2013

(54) METHOD FOR SUPPLYING GRANULATED MATERIAL TO A POLYMERISATION REACTOR

(75) Inventors: Yahya Bouquoyoue, Waterloo (BE); Claude Queyrel, Pau (FR)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 0 days.

(21) Appl. No.: 12/681,065

(22) PCT Filed: Sep. 26, 2008

(86) PCT No.: PCT/EP2008/062975
§ 371 (c)(1),
(2), (4) Date: Sep. 13, 2010

(87) PCT Pub. No.: WO2009/043828
PCT Pub. Date: Apr. 9, 2009

(65) Prior Publication Data
US 2011/0196119 A1 Aug. 11, 2011

(30) Foreign Application Priority Data
Oct. 1, 2007 (EP) .................................. 07117589

(51) Int. Cl.
*C08F 2/34* (2006.01)
*C08F 2/00* (2006.01)
*B01J 8/10* (2006.01)
*B65G 53/08* (2006.01)
*C08F 10/00* (2006.01)

(52) U.S. Cl. .......... 526/88; 526/919; 422/131; 422/232; 406/50; 406/146; 251/315.01; 222/368; 222/553

(58) Field of Classification Search .................... 526/88, 526/919; 251/315.01, 315.16; 222/367, 222/368, 553; 422/131, 232; 406/50, 146
See application file for complete search history.

(56) References Cited

U.S. PATENT DOCUMENTS

| 3,139,996 A | | 7/1964 | Welty | |
|---|---|---|---|---|
| 3,167,398 A | * | 1/1965 | Whittington | .................. 422/131 |
| 3,227,312 A | * | 1/1966 | Solvik et al. | .................... 222/52 |

(Continued)

FOREIGN PATENT DOCUMENTS

| CN | 1733811 A | 2/2006 |
|---|---|---|
| DE | 7148831 U1 | 4/1972 |

(Continued)

OTHER PUBLICATIONS

Casagrande et al., "Ethylene polymerization using tris(pyrazolyl)borate vanadium (V) catalysts in situ supported on MAO-modified silica", Journal of Molecular Catalysis, May 2006, pp. 19-24 (6 pages).

(Continued)

*Primary Examiner* — Fred M Teskin

(57) ABSTRACT

The present invention relates to methods for delivering granulated material to a reactor for use in the polymerization of alpha-olefin comprising the steps of: providing a first conduit having a granulated material inlet, the conduit being operably connected to a pocket ball valve comprising at least one pocket, said pocket ball valve being operably connected to a second conduit, said second conduit being operably connected to a polymerization reactor; introducing a granulated material to the first conduit through said inlet; metering the granulated material through the pocket ball valve; and passing said material through the second conduit to the polymerization reactor. The present invention also relates to polyolefin production processes and polyolefin producing units.

13 Claims, 5 Drawing Sheets

U.S. PATENT DOCUMENTS

| | | | |
|---|---|---|---|
| 3,726,845 A | | 4/1973 | Nickerson |
| 3,790,036 A | * | 2/1974 | Miller .......................... 406/128 |
| 4,171,019 A | | 10/1979 | Cole |
| 4,687,381 A | | 8/1987 | Dumain et al. |
| 4,774,299 A | * | 9/1988 | Dumain et al. ................. 526/64 |
| 4,828,145 A | | 5/1989 | Raufast |
| 5,352,749 A | | 10/1994 | DeChellis et al. |
| 5,556,238 A | | 9/1996 | Chinh |
| 6,090,740 A | * | 7/2000 | Agapiou et al. .............. 502/104 |
| 6,319,995 B2 | * | 11/2001 | Glenn et al. .................... 526/64 |
| 6,398,463 B1 | | 6/2002 | Morterol |
| 2002/0034464 A1 | | 3/2002 | Glenn et al. |
| 2005/0267268 A1 | * | 12/2005 | Hendrickson ................... 526/67 |
| 2006/0185740 A1 | | 8/2006 | DePierri et al. |

FOREIGN PATENT DOCUMENTS

| | | |
|---|---|---|
| EP | 0529977 A1 | 8/1992 |
| EP | 0958857 A1 | 5/1998 |
| EP | 1134225 | 9/2001 |
| WO | WO 97/48736 | 12/1997 |
| WO | WO 01/16005 | 3/2001 |

OTHER PUBLICATIONS

Gil et al., "Titanium and zirconium complexes containing sterically hindered hydrotris(pyrazolyl)borate ligands: synthesis, structural characterization, and ethylene polymerization studies", Journal of Organometallic Chemistry, Oct. 2003, pp. 286-292 (7 pages).

* cited by examiner

METHOD FOR SUPPLYING GRANULATED MATERIAL TO A POLYMERISATION REACTOR

CROSS-REFERENCE TO RELATED APPLICATIONS

This application claims the benefit of PCT/EP2008/062975, filed Sep. 26, 2008, which claims priority from EP 07117589.7, filed Oct. 1, 2007.

FIELD OF THE INVENTION

The present invention relates to a granulated material delivery method for introducing a material to a reactor for polymerizing one or more olefin(s). The present invention in particular relates to a catalyst delivery means for introducing a catalyst into a polymerization reactor.

BACKGROUND OF THE INVENTION

It is known that the polymerization of olefins e.g. ethylene, especially by a gas phase polymerization process, involves the polymerization of olefin monomer with the aid of catalyst and optionally, if required depending on the used catalyst, a co-catalyst. Suitable catalysts for use in the production of polyolefins, and in particular for the preparation of polyethylene, comprise chromium-type catalysts, Ziegler-Natta catalysts and metallocene catalysts.

U.S. Pat. No. 3,726,845 describes the supply and control of the amount of catalyst and the maintenance of the catalyst line and pump free by alternately feeding catalyst slurry and diluent to the reaction zone.

It is well known that the polymerization reaction is quite sensitive to the quantity of catalyst utilized. It is important to control catalyst flow to a reactor since unexpected or uncontrolled catalyst injection in a reactor could lead to reactions that exceed cooling capacity of the reactor.

However, one of the major problems in the injection of catalyst to a reactor in prior art methods is that it is difficult to control the amount of catalyst and the flow rate of the catalyst injected.

It is an object of the present invention to provide for a method for the delivery of catalyst to a polymerization reactor wherein at least one of the above mentioned drawbacks is overcome.

SUMMARY OF THE INVENTION

This invention provides for an improved method for delivering granulated material to a reactor for use in the polymerization of alpha-olefins comprising the steps of:
(a) providing a first conduit having a granulated material inlet, the first conduit being operably connected to a pocket ball valve comprising at least one pocket, said pocket ball valve being operably connected to a second conduit, optionally connected to said second conduit through an intermediate chamber via a shut-off valve operably connected to said pocket ball valve, said second conduit being operably connected to a polymerization reactor,
(b) introducing a granulated material to the first conduit through said inlet, metering the granulated material through the pocket ball valve and
(c) introducing said granulated material through said second conduit into said reactor.

In a first embodiment, said method for delivering granulated material to a reactor for use in the polymerization of alpha-olefins comprises the steps of:
(a) providing a first conduit having a granulated material inlet, the conduit being operably connected to a pocket ball valve comprising at least one pocket, said pocket ball valve being operably connected to a second conduit, said second conduit being operably connected to a polymerization reactor;
(b) introducing a granulated material to the first conduit through said inlet; metering the granulated material through the pocket ball valve;
(c) and passing said material through the second conduit to the polymerization reactor, wherein said first conduit, said pocket ball valve and said second conduit are under pressure and said at least one pocket has a volume ranging from about 1 to about 100 cm$^3$.

In an embodiment, said polymerization reactor is a gas phase polymerization reactor. In another embodiment, said polymerization reactor is a slurry reactor. In an embodiment, said pressure is ranging from about 5 to about 80 bar.

The present invention has the advantage of providing a delivery system allowing precise dosing and metering of the granulated material while preserving the lifetime of the pocket ball valve. The pocket ball valve for use in the present invention is not subjected to pressure difference since the whole delivery system is under pressure.

At least one feed line for monomer fluid can be operably connected to the second conduit configured to transfer said granulated material to the polymerization reactor. The transfer fluid can be monomer or other carrying fluid compatible with polymerization, referred to as inert fluid. The pocket ball valve can be also operably connected to at least one feed line for an inert fluid.

The first conduit is preferably operably connected to a run tank for the delivery of catalyst wherein said run tank is under pressure.

The present invention also provides a polyolefin production process, comprising the steps of:
introducing into a reactor one or more olefin reactants, and optionally diluents,
introducing into said reactor one or more catalyst and while circulating said reactants, catalysts and diluents,
polymerizing one or more olefin reactants to produce a polymer, and
recovering the olefin polymer particles produced,
wherein said catalyst is delivered according to a method for delivering granulated material according to the invention.

The present invention also provides a polyolefin producing unit, comprising:
means for feeding monomer, co-monomer, and optionally diluent to at least one polymerization reactor;
means for feeding a polymerization catalyst to said at least one polymerization reactor;
a reactor system comprising at least one polymerization reactor;
wherein said means for feeding a polymer catalyst comprises a first conduit having a catalyst inlet, the first conduit being operably connected to a pocket ball valve, said pocket ball valve being operably connected to a second conduit, said second conduit being operably connected to said polymerization reactor, and wherein said pocket ball valve has at least one pocket having a volume ranging from about 1 to about 100 cm$^3$.

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous. The description is only given by way of example and does not limit the invention. The reference numbers relate to the hereto-annexed figures.

DETAILED DESCRIPTION

Figure 1:
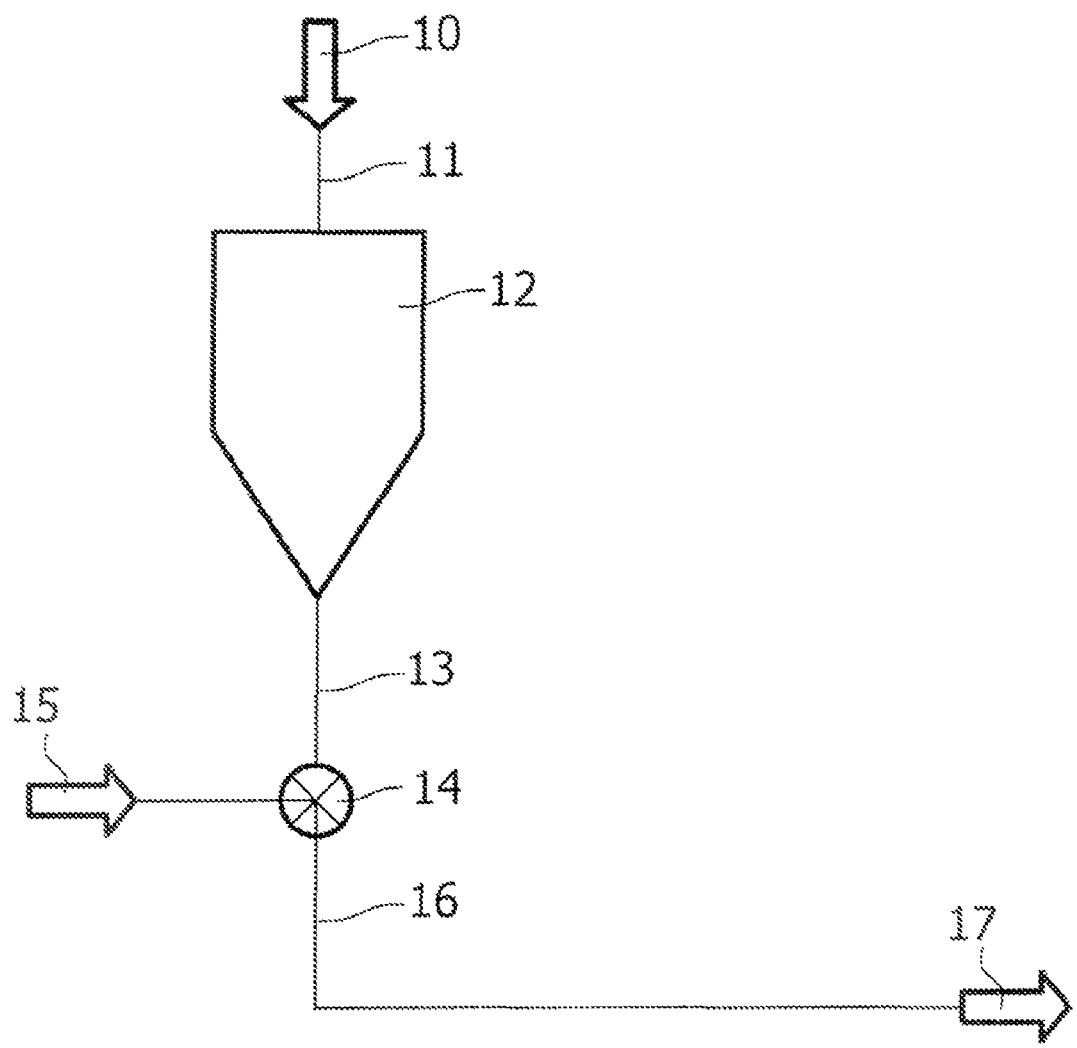
FIG. 1 represents a simplified diagram of a catalyst delivery system according to an embodiment of the present invention.

The present invention provides for a method for delivering granulated material, in particular a catalyst powder and/or a prepolymer to a gas or slurry phase polymerization reactor utilizing a pocket ball valve, wherein the catalyst and/or prepolymer delivering system is under pressure, the delivering of said catalyst and/or prepolymer being performed via a pocket ball valve comprising at least one pocket having a volume of about 1 cm$^3$ to about 100 cm$^3$. In an embodiment, said pressure is ranging from about 5 to about 80 bar, preferably from about 15 to about 50 bar. Said pocket ball valve comprises at least one pocket that has a volume ranging from about 1 to about 100 cm$^3$, preferably from about 10 to about 100 cm$^3$, for example from about 20, 30, 40, 50 to about 100 cm$^3$. The small size of the pocket allows the near to continuous dosing of the catalyst and/or prepolymer. In an embodiment, said pocket ball valve comprises an elastic member operably affixed at the bottom of said at least one pocket.

The present invention also provides an alpha-olefins polymerization process comprising
  providing a polymerization reactor configured for the polymerization of alpha-olefins,
  providing a first conduit having a catalyst and/or prepolymer inlet configured for the conveying of a catalyst and/or prepolymer, the conduit being operably connected to a pocket ball valve configured for the metering of said catalyst and/or prepolymer, said pocket ball valve being operably connected to a second conduit configured for conveying said catalyst and/or prepolymer to a polymerization zone, said second conduit being operably connected to the polymerization reactor,
  introducing monomer into said reactor,
  introducing a catalyst and/or prepolymer to the first conduit through the catalyst inlet, metering the catalyst and/or prepolymer through the pocket ball valve and passing the catalyst and/or prepolymer through the second conduit to the polymerization reactor, and polymerizing said monomer in the presence of said catalyst and/or prepolymer, wherein said first conduit, said pocket ball valve and said second conduit are under pressure.

In a preferred embodiment, the invention also provides for a catalyst feeder for use in combination with a reactor, the catalyst feeder comprising a catalyst vessel (also referred to as a run tank) for containing a polymerization catalyst, the catalyst vessel being operably connected to a first catalyst injection conduit for delivering the polymerization catalyst to the reaction zone, said catalyst injection conduit being operably connected to a pocket ball valve, said pocket ball valve being operably connected to a second injection conduit operably connected to a polymerization reactor, wherein said catalyst vessel, said first injection conduit, said pocket ball valve and said second injection conduit are under pressure. In an embodiment, said second catalyst injection conduit can be disposed within a support tube that protrudes through the polymerization reactor wall into the reaction zone. The process may further include introducing at least one monomer stream to the conduit to provide a mixed catalyst stream downstream of the pocket ball valve.

As used herein the term "conduit" refers to any piping, tubing, tube, etc. configured to pass a catalyst and/or a prepolymer there through.

The present invention is particularly useful for the delivery of catalyst to a polymerization reactor, using a pocket ball valve making it possible to dispense reliably determined quantities of a granular substance, such as granular or powdery catalyst or prepolymer.

The polymerization process may be carried out in any type of polymerization system including, but not limited to, a solution, gas phase or slurry process, or combinations thereof.

The process is particularly useful for the introduction of a catalyst into an alpha-olefin polymerization reactor wherein the polymerization is performed under high pressure, and more especially into a gas-phase alpha-olefin polymerization reactor such as for example into a gas-phase fluidized-bed reactor or in a gas-phase stirred reactor. Preferably, said reactor is operated, for example under fluidized bed conditions.

Typically, in a gas phase polymerization, a continuous cycle is employed wherein one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. The gaseous stream containing one or more monomers may be continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. Alternatively, other types of gas phase polymerization processes can also be used.

As granulated material, any catalyst powder capable of polymerizing polyolefins in a polymerization reactor is contemplated. For example, metallocene catalyst systems or Ziegler-Natta catalysts may be utilized. Useful catalysts are described in detail in U.S. Pat. No. 6,368,999, which catalyst descriptions are hereby incorporated by reference.

The catalyst can be in the form of a granulated solid (such as a powder) or in the form of a prepolymer powder. The term "prepolymer" refers for a solid obtained by polymerization in particle form of a catalytic system in a previous polymerization stage, in a way such that the catalyst remains active. The prepolymer can then be used as a catalyst for a polymerization process.

Preferably, the catalyst may be in the form of free-flowing powder. The free-flowing powder may be conducted/transferred through the second conduit by an inert fluid. In an embodiment, the pocket ball valve for use in the present invention is operably connected to a feed tube configured to convey inert fluid (for example inert gas, such as nitrogen).

Preferably, said catalyst is a metallocene catalyst system. When using a metallocene catalyst, the method may include combining a carrier, such as an inert fluid, with the metallocene catalyst prior to introducing the metallocene catalyst to the polymerization reactor to transport the metallocene catalyst through the second conduit.

The conduit for transferring said catalyst from the storage vessel to the reactor is provided with a pocket ball valve. According to the present invention, the catalyst delivery system is under pressure. Preferably, said system under a pressure ranging from about 5 to about 80 bar, preferably from about 15 to about 50 bar, more preferably from about 10 to about 40 bar, more preferably from about 15 to about 25 bar, for example about 20 bar.

FIG. 1 schematically represents a catalyst delivery system according to an embodiment of the invention. The catalyst can be unloaded in a buffer tank 10 not shown (for example using pneumatic transport system under nitrogen . . . ). The buffer tank receives the catalyst from the container, under low pressure. This tank 10 can operate at two pressure levels: nearly atmospheric when unloading the catalyst container and above the reactor pressure for the transfer of the catalyst to the run tank 12 under high pressure. One catalyst feeding line 11 is shown. The system may comprise more than one catalyst feeding line.

The catalyst is discharged through said catalyst feeding line 11 into a run tank 12, under high pressure. The run tank 12 receives the catalyst from the catalyst buffer tank, and can store sufficient catalyst for several hours of operation. Preferably, the run tank 12 operates at a constant pressure, which can be set a few bar above the reactor pressure or higher.

The catalyst can then be discharged from the run tank 12 through a first conduit 13 operably connected to a rotary pocket ball valve 14. Said rotary valve 14, is fitted with a motor (not shown) suitable for variable speed. In an embodiment, said rotary pocket ball valve 14 is operably connected to an inert fluid or a monomer feeding line 15. The rotary ball valve 14 is operably connected to a second conduit 16 operably connected to the polymerization zone 17. Although not shown several other lines can be connected to the second conduit 16 for delivering monomers or diluent to the polymerization zone 17.

Although not shown, in an embodiment, the said second conduit 16 can be provided with a full bore rapid-opening valve situated near to the reactor.

In an embodiment, not shown, a catalyst dump tank can be operably connected to the catalyst run tank 12 and/or buffer tank. The catalyst dump tank can receive discarded catalyst from the buffer tank and from the run tank, and store them as a slurry in oil for example.

The present invention encompasses also a polyolefin producing unit, comprising:
  means for feeding monomer, co-monomer, and optionally diluent to at least one polymerization reactor;
  means for feeding a polymerization catalyst to said at least one polymerization reactor;
  a reactor system comprising at least one polymerization reactor;
  one or more monomer and/or diluent recovery system configured to recover unreacted monomer and/or diluent discharged from the polymerization reactor; and
  a polyolefin processing system configured to process polyolefin particles produced in said polymerization reactor;
  wherein said means for feeding a polymer catalyst comprises a first conduit having a catalyst inlet, the first conduit being operably connected to a pocket ball valve, said pocket ball valve being operably connected to a second conduit, said second conduit being operably connected to said polymerization reactor, and wherein said pocket ball valve has at least one pocket with a volume ranging from about 1 to about 100 cm$^3$.

In a second embodiment, the invention provides an improved method for delivering granulated material to a reactor for use in the polymerization of alpha-olefins comprising the steps of:
(a) providing a first conduit having a granulated material inlet, the first conduit being operably connected to a pocket ball valve comprising at least one pocket, said pocket ball valve being operably connected to an intermediate chamber through a shut-off valve, said intermediate chamber being operably connected to a second conduit operably connected to a polymerization reactor,
(b) introducing a granulated material to the first conduit through said inlet, metering the granulated material through the pocket ball valve and introducing said granulated material through said shut-off valve to the intermediate chamber, under reduced pressure (preferably around about 1 atm),
(c) closing said shut-off valve and pressurizing the intermediate chamber prior to introducing said granulated material into the second conduit and to the polymerization reactor. In an embodiment, said pressurization is ranging from 5 to 80 bar.

As used herein the term "reduced pressure" refers to a pressure near the atmospheric pressure and is in contrast to the high pressure used during the polymerization process. Preferably, the pocket ball valve is operated near atmospheric pressure, i.e. around 1 atm (about 100 000 Pa), for example from about 1 to 2 bar.

The present invention in this embodiment has the further advantage of providing a delivery system allowing precise dosing and metering of the granulated material while preserving the lifetime of the pocket ball valve, since the pocket ball valve in this embodiment is operating under low pressure. In this embodiment, the pocket ball valve for use in the present invention is not subjected to pressure difference since it is protected from the pressure of the polymerization system by the shut-off valve isolating the intermediate chamber from the pocket ball valve. At least one feed line for monomer fluid can be operably connected to the second conduit configured to transfer said granulated material from the intermediate chamber to the polymerization reactor. The pocket ball valve can be also operably connected to at least one feed line for an inert fluid. The first conduit is preferably operably connected to a run tank for the delivery of catalyst wherein said run tank is under low pressure, such as atmospheric pressure.

In this embodiment, the conduit for transferring said catalyst from the storage vessel to the reactor is provided with a pocket ball valve operably connected to an intermediate chamber through a shut-off valve. In this embodiment, the shut-off valve protects the pocket ball valve from the pressure operated during the polymerization process. Preferably, said polymerization process is performed under a pressure ranging from about 5 to about 80 bar, preferably from about 15 to about 50 bar, more preferably from about 10 to about 40 bar, more preferably from about 15 to about 25 bar, for example about 20 bar.

Figure 2:
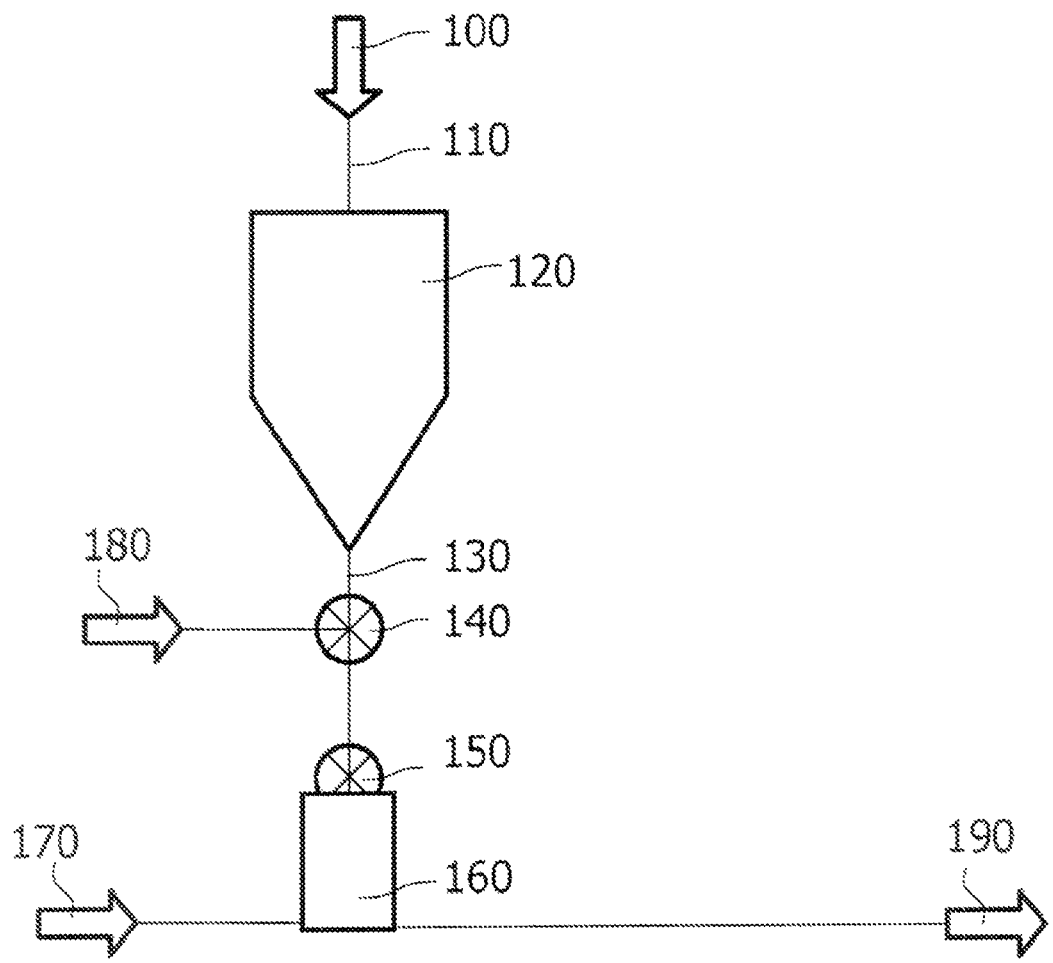
FIG. 2 represents a simplified diagram of a catalyst delivery system according to another embodiment of the present invention.

FIG. 2 schematically represents a catalyst delivery system according to this second embodiment of the invention. The catalyst can be unloaded in a buffer tank 100 not shown (for example using pneumatic transport system under nitrogen . . . ). The buffer tank receives the catalyst from the container, under low pressure. This buffer tank operates at nearly atmospheric pressure when unloading the catalyst container, and the catalyst can then be transferred at nearly atmospheric pressure to the run tank 120 which is also under nearly atmospheric pressure. One catalyst feeding line 110 is shown. The system may comprise more than one catalyst feeding line.

The catalyst is discharged through said catalyst feeding line 110 into the run tank 120, under atmospheric pressure. The run tank 120 receives the catalyst from the catalyst buffer tank, and can store sufficient catalyst for several hours of operation.

The catalyst can then be discharged from the run tank 120 through a first conduit 130 operably connected to a rotary pocket ball valve 140. Said rotary valve 140, is fitted with a motor (not shown) suitable for variable speed. In an embodiment, said rotary pocket ball valve 140 is operably connected to an inert fluid or a monomer feeding line 180. The rotary ball valve 140 is operably connected to a shut-off valve 150 operably connected to an intermediate chamber 160. Said shut-off valve 150 is provided on the top of said intermediate chamber 150, thereby hermetically isolating said intermediate chamber 160 from the catalyst delivery system (pocket ball valve and run tank) when closed. This intermediate chamber 160 can operate at two pressure levels nearly atmospheric when unloading of the catalyst from the pocket ball valve 140 and above the reactor pressure, once the shut-off valve 150 is closed, for the transfer of the catalyst to the polymerization zone 190 under high pressure. In an embodiment, said intermediate chamber 160 is operably connected to an inert fluid or a monomer feeding line 170. A second conduit is connecting the bottom part of the intermediate chamber to the polymerization zone 190 (reactor). Although not shown, in an embodiment, the said second conduit can be provided with a full bore rapid-opening valve situated near to the reactor. Although not shown other lines can be operably connected to said second conduit for delivering monomers or diluent to the polymerization zone 190.

In an embodiment, not shown, a catalyst dump tank can be operably connected to the catalyst run tank 120 and/or buffer tank. The catalyst dump tank can receives discarded catalyst from the buffer tank and from the run tank, and stores them as a slurry in oil for example. In an embodiment, said pocket ball valve and said shut-off valve are operably connected through a conduit to an intermediate chamber through a shut-off valve. The pocket ball valve is operated at nearly atmospheric structure (also referred as reduced pressure, i.e. at about 1 atm). Said pocket ball valve comprises at least one pocket. In an embodiment, said at least one pocket that has a volume ranging from about 1 to about 100 cm$^3$, preferably from about 10 to about 100 cm$^3$, for example from about 20, 30, 40, 50 to about 100 cm$^3$. The small size of the pocket allows the near to continuous dosing of the catalyst and/or prepolymer. In an embodiment, said pocket ball valve comprises an elastic member operably affixed at the bottom of said at least one pocket.

The present invention also provides for a method for delivering a catalyst and/or a prepolymer to a gas or slurry phase polymerization reactor utilizing a pocket ball valve operably connected to an intermediate chamber provided with a shut-off valve isolating said chamber from said pocket ball valve, when said shut-off valve is shut.

The present invention also provides an alpha-olefins polymerization process comprising:
  providing a polymerization reactor configured for the polymerization of alpha-olefins,
  providing a first conduit having a catalyst and/or prepolymer inlet configured for the conveying of a catalyst and/or prepolymer, the conduit being operably connected to a pocket ball valve configured for the metering of said catalyst and/or prepolymer, said pocket ball valve being operably connected to an intermediate chamber through a shut-off valve, said intermediate chamber being operably connected to a second conduit configured for conveying said catalyst and/or prepolymer to a polymerization zone, said second conduit being operably connected to the polymerization reactor,
  introducing monomer into said reactor,
  introducing a catalyst and/or prepolymer to the first conduit through the catalyst inlet, metering the catalyst and/or prepolymer through the pocket ball valve and introducing said catalyst and/or prepolymer through said shut-off valve to the intermediate chamber, under reduced pressure,
  closing said shut-off valve and pressurizing the intermediate chamber prior to introducing said granulated material into the second conduit and to the pressurized polymerization reactor, and polymerizing said monomer in the presence of said catalyst and/or prepolymer.

The invention also provides for a catalyst feeder for use in combination with a reactor, the catalyst feeder comprising a catalyst vessel (also referred to as a run tank) for containing a polymerization catalyst, the catalyst vessel being operably connected to a first catalyst injection conduit for delivering the polymerization catalyst to the reaction zone, said catalyst injection conduit being operably connected to a pocket ball valve, said pocket ball valve being operably connected to an intermediate chamber through a shut-off valve, said intermediate chamber being operably connected in its bottom to a second injection conduit operably connected to a polymerization reactor. In an embodiment, the intermediate chamber consists of a vertical cylindrical container having a lower portion which is conical or in the form of a truncated cone. The capacity of this intermediate chamber is at least 1.1 times, preferably at least 1.5 times the volume of the powder delivered periodically by the metering device. However, the capacity of this intermediate chamber may be considerably larger.

The present invention also provides a polyolefin producing unit, comprising:
  means for feeding monomer, co-monomer, and optionally diluent to at least one polymerization reactor,
  means for feeding a polymerization catalyst to said at least one polymerization reactor;
  a reactor system comprising at least one polymerization reactor.
wherein said means for feeding a polymer catalyst comprises a first conduit having a catalyst inlet, the first conduit being operably connected to a pocket ball valve, said pocket ball valve being operably connected to an intermediate chamber through a shut-off valve, said intermediate chamber being operably connected to a second conduit, said second conduit being operably connected to said polymerization reactor, The pocket ball valve for use in the invention allows the precise metering of the catalyst and allows the feeding of a controlled flow rate of catalyst to the reactor. The pocket ball valve allows the transfer of a predetermined volume of catalyst to the reactor. The catalyst discharged by the valve is carried to the reactor vessel by gas flow. In an embodiment, said gas flow is an inert fluid flow. In another embodiment, said gas flow is a monomer fluid flow. In another embodiment said gas flow is an inert fluid flow and monomer fluid flow.

The pocket ball valve for use in the invention allows dispensing reliably determined quantities of a catalyst powder to a polymerization reactor, and more preferably into a gas-phase polymerization reactor operated, for example under fluidized bed conditions.

The present invention employs a pocket ball valve, which reliably dispenses, without the risk of blockage, a determined quantity of catalyst powder, for example from about 1 to about 100 cm$^3$ into the polymerization reactor. Preferably, said pocket ball valve is used with free flowing catalyst.

Figure 3:
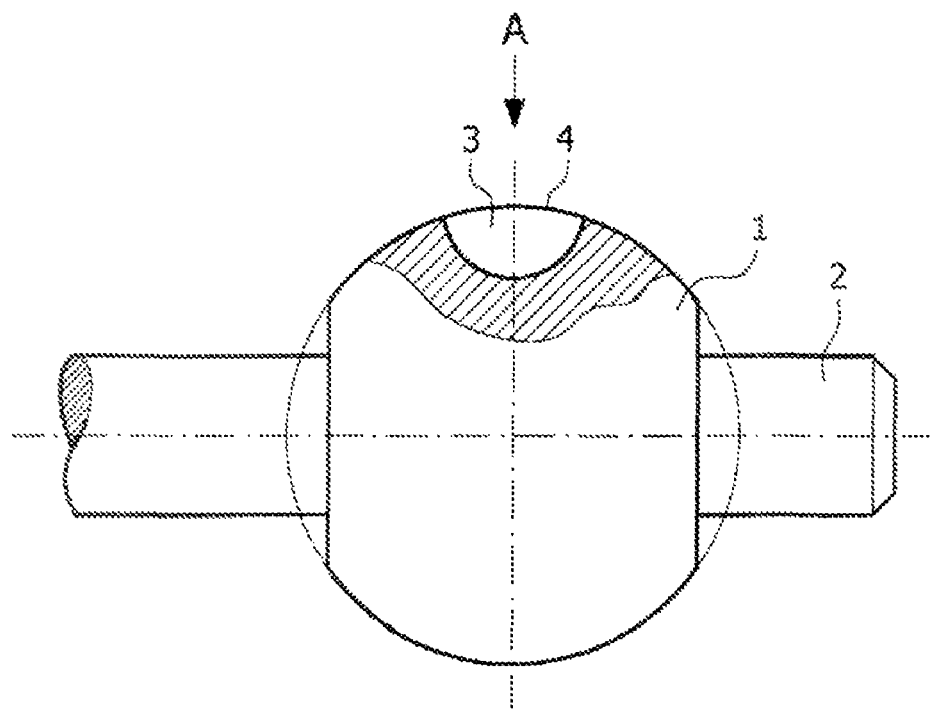
FIG. 3 represents a simplified diagram of the spherical core of a pocket ball valve for use in an embodiment of the present invention.
Figure 4:
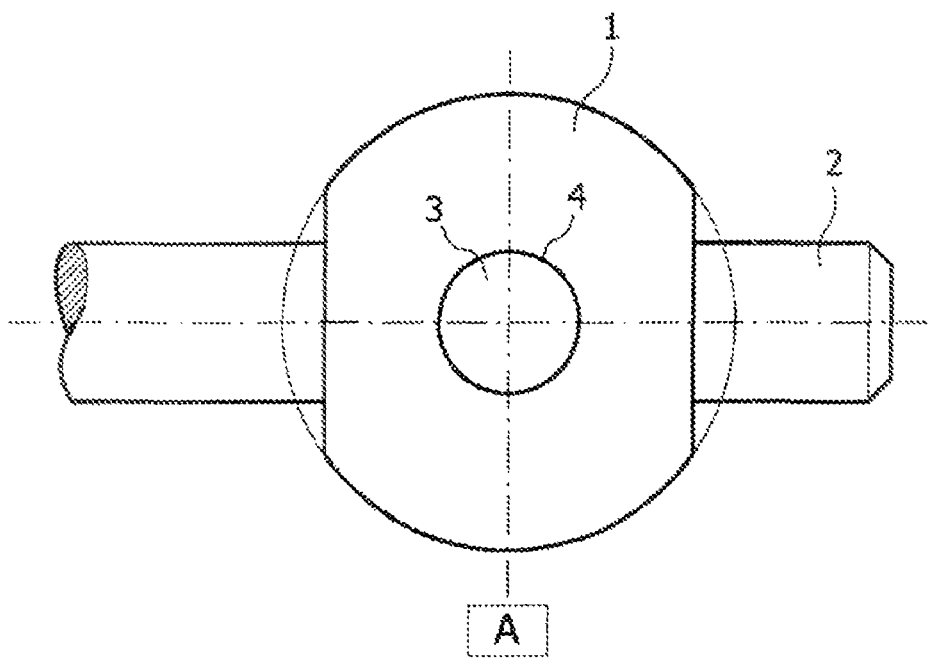
FIG. 4 represents a top view along A of the spherical core of FIG. 3.

With reference to FIG. 3, the spherical core of a pocket ball valve for use in any embodiment of the invention is schematically represented. The pocket ball valve for use in the invention is described hereunder for the delivery of catalyst, but it is understood that said pocket ball valve can be used for the delivery of any granulated material. The pocket ball valve according to an embodiment of the invention comprises a substantially spherical core 1 rotatable on a horizontal axis 2 and housed within a stationary casing (not shown), the spherical core 1 having at least one cavity 3 for receiving the catalyst defined by side and bottom surfaces within the spherical core 1 and a circular opening 4 at the surface of the core 1. The upper part of the casing has an inlet orifice for feeding, and the lower part of the casing having an outlet orifice for discharging the catalyst. FIG. 4 represents the top view along A of the spherical core of FIG. 3.

In an embodiment, said spherical core is made of metal, thereby providing for robustness of the system.

The pocket ball valve may comprise one or more cavities (also referred to as pockets) depending on the size of the spherical core of the valve and the volume of the cavities. The number of cavities also depends on the manner in which the pocket ball valve operates, as will be described subsequently. If the spherical core comprises more than one cavity, the cavities must be distanced from each other, in a manner such that at any instant during the rotation of the core, the inlet orifice and the outlet orifice of the casing can each be placed only in communication with a single cavity. In this case, it is preferable that at the moment when one cavity is placed in communication with the inlet orifice, another cavity is in communication with the outlet orifice.

The inlet and outlet orifices for the catalyst are preferably located at the top and the bottom respectively of the casing. Preferably, they are diametrically opposed in relation to the centre of the spherical core and arranged on an axis vertical and perpendicular to the axis of rotation of the spherical core, so that the filling and emptying of the cavity is provided by the force of gravity exerted on the free flowing catalyst. The inlet and outlet orifices in the casing are preferably circular and of equal diameter.

The diameter of the cavity is less than or preferably equal to the diameter of the outlet orifice of the casing. In an embodiment, said cavity has a volume ranging from about 1 to about 100 cm$^3$, preferably from about 20 to about 70 cm$^3$, more preferably from about 20 to about 100 cm$^3$.

The shape of the cavity can be conical, cylindrical, spherical, or truncated cone. In a preferred embodiment, said shape is spherical. In another embodiment, said shape is a truncated cone.

Figure 5:
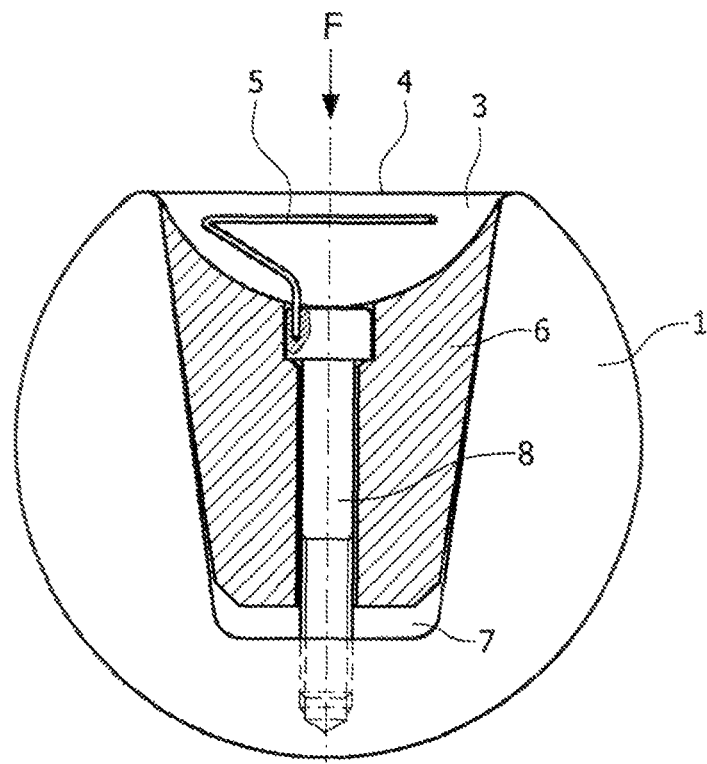
FIG. 5 represents a simplified diagram of a spherical core of a pocket ball valve for use in an embodiment of the present invention.
Figure 6:
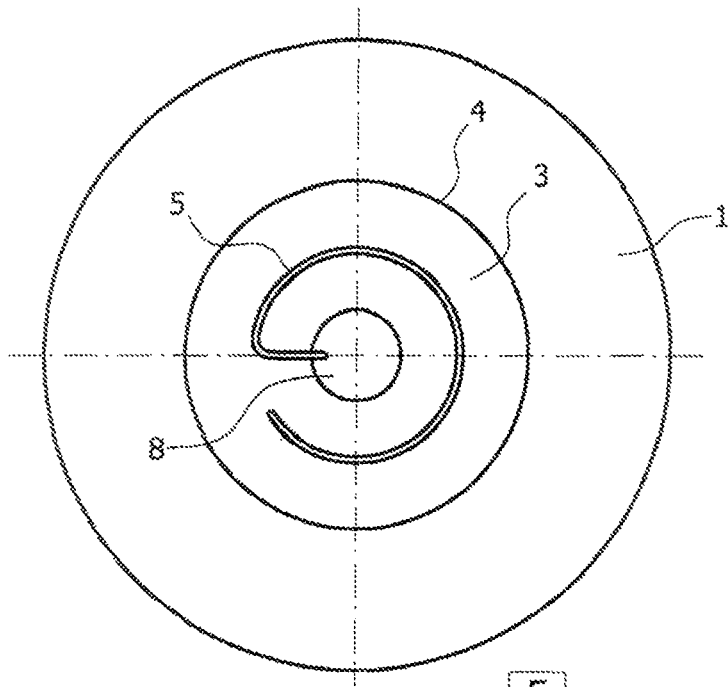
FIG. 6 represent a reduced top view along F of the spherical core of FIG. 5.

In an embodiment, illustrated in FIG. 5, said spherical core 1 is provided with a spherical cavity 3 provided with an elastic member 5 (for example a spring) fixed at the bottom of said cavity 3. In an embodiment said spring is helical and fixed to a holding means 6 (such as a plunger) lodged in the bottom 7 of said cavity 3. In an embodiment, said holding means is fixed to the bottom 7 of said cavity 3 by means of a fixing means 8 such as a screw. FIG. 6 represents a reduced top view along the axe F of the spherical core 1 FIG. 5.

Said spring aims at facilitating the emptying of the catalyst out of the pocket ball valve thereby restoring the energy of compression due to the high pressure to which the contents of the cavity are subjected.

Figure 7:
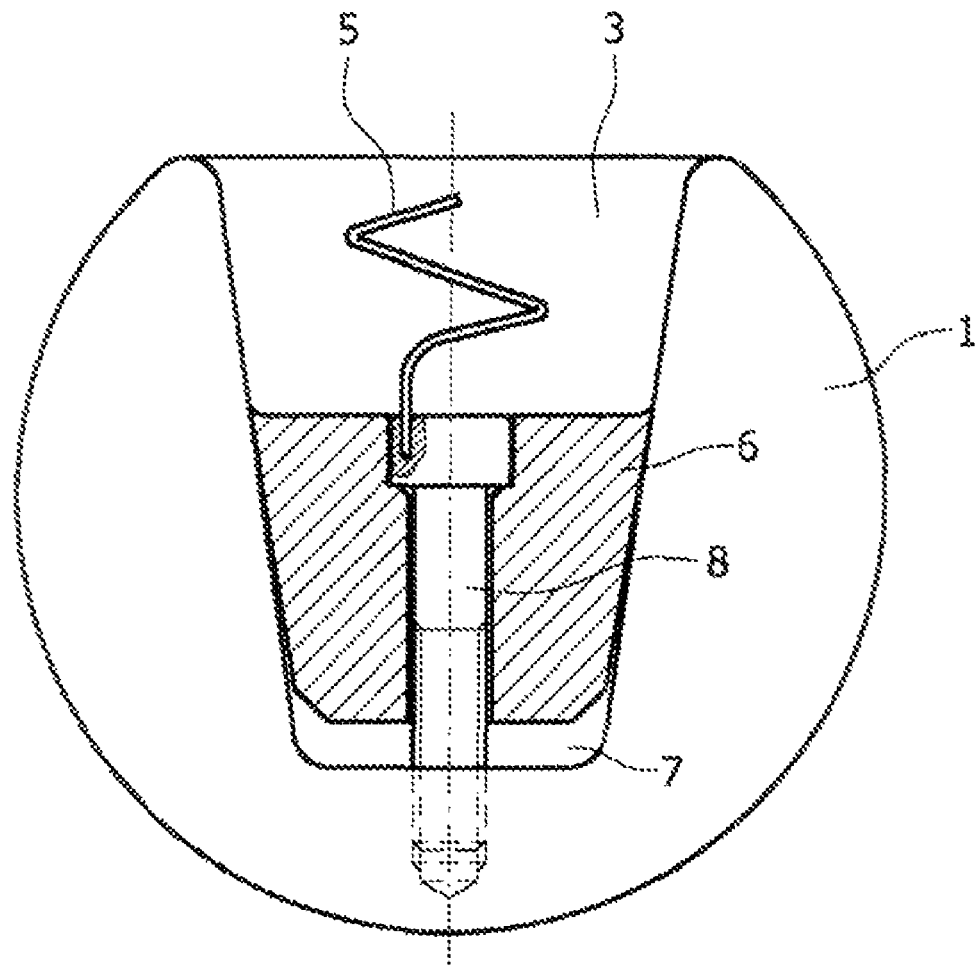
FIG. 7 represents a simplified diagram of a spherical core of a pocket ball valve for use in an embodiment of the present invention.

FIG. 7 represents another embodiment wherein the spherical core 1 is provided with a cavity 3 in the shape of a truncated cone. Said cavity 3 is provided with an elastic member 5 (for example a spring) fixed at the bottom of said cavity 3, by means of a holding means 6 fixed to the bottom 7 of said cavity 3 by means of a fixing means 8.

When the opening of the cavity is oriented upwards and placed in communication with the feed orifice the helical spring the upper part of which is below the opening is compressed under the effect of its own weight, the weight of the catalyst powder which penetrates into the pocket. When the opening of the pocket is then oriented downwards and placed in communication with the outlet orifice, the helical spring springs back and causes a shearing force which breaks the force of adhesion between the wall of the pocket and the catalyst powder, which facilitates the discharge of the latter out of the pocket.

The present invention also provides a polyolefin production process, comprising the steps of: introducing into a reactor one or more olefin reactants, and optionally diluents, introducing into said reactor one or more catalyst and while circulating said reactants, catalysts and diluents, polymerizing one or more olefin reactants to produce a polymer, and recovering the olefin polymer particles produced, wherein said catalyst is delivered according to a granulated delivery method according to the invention. Preferably said polyolefin production process is a gas phase polyolefin production process. Preferably, said catalyst is a free-flowing metallocene catalyst system. In an embodiment, the catalyst is introduced into the reactor by means of a fluid stream. In an embodiment, said fluid stream is an inert and/or a monomer fluid stream.

With the present invention, it is not necessary to use high proportion of inert fluid. According to the process of the present invention, the proportion of inert fluid is preferably from about 5% to about 55% by volume, particularly preferably from about 5 to about 30% by volume, based on the total volume of the reaction gas. In an embodiment, the catalyst is pushed into the reactor using monomer stream, such as ethylene, instead of with an inert fluid stream.

The present process allows the precise metering of the catalyst or of the prepolymer. The metering is furthermore volumetric since the valve is set up to operate slowly.

The delivery systems and methods according to the invention provide the advantage of having to clean the catalyst delivery system less often. In view of the design of the system and of the pocket ball valve, which allows the delivery of small quantity of catalyst, the delivery system needs only to be cleaned for example once every week, preferably once every two weeks.

The invention claimed is:

1. Method for delivering granulated material to a reactor for use in the polymerization of alpha-olefin comprising the steps of:
   providing a first conduit having a granulated material inlet, the conduit being operably connected to a pocket ball valve comprising at least one pocket, said pocket ball valve comprising an elastic member operably affixed at the bottom of said at least one pocket, said pocket ball valve being operably connected to a second conduit, said second conduit being operably connected to a polymerization reactor, introducing a granulated material to the first conduit through said inlet, metering the granulated material through the pocket ball valve and passing said material through the second conduit to the polymerization reactor, wherein said first conduit, said pocket ball valve and said second conduit are under pressure and said at least one pocket has a volume ranging from about 1 to about 100 cm$^3$.

2. Method according to claim 1, wherein said polymerization reactor is a gas phase polymerization reactor.

3. Method according to claim 1, wherein said polymerization reactor is a slurry polymerization reactor.

4. Method according to claim 1, wherein at least one feed line for monomer fluid is operably connected to said second conduit.

5. Method according to claim 1, wherein said pocket ball valve is operably connected to at least one feed line for an inert gas.

6. Method according to claim 1, wherein said granulated material is a solid, free-flowing catalyst suitable for the polymerization of alpha-olefins.

7. Method according to claim 1, wherein said granulated material is a prepolymer powder suitable for the polymerization of alpha-olefins.

8. Method according to claim 1, wherein said pressure is ranging from about 5 to about 80 bar.

9. Polyolefin production process, comprising the steps of
introducing into a reactor one or more olefin reactants, and optionally diluents,
introducing into said reactor one or more catalyst and while circulating said reactants, catalysts and diluents,
polymerizing one or more olefin reactants to produce a polymer, and
recovering the olefin polymer particles produced,
wherein said catalyst is delivered according to a method as defined in claim 1.

10. Process according to claim 9, wherein the polymerization is a gas phase polymerization.

11. Process according to claim 9, wherein said catalyst comprises a metallocene catalyst system.

12. Process according to claim 9, wherein said catalyst is introduced into the reactor by means of a fluid stream.

13. Polyolefin producing unit, comprising:
means for feeding monomer, co-monomer, and optionally diluent to at least one polymerization reactor, means for feeding a polymerization catalyst to said at least one polymerization reactor;
a reactor system comprising at least one polymerization reactor,
one or more monomer and/or diluent recovery system configured to recover unreacted monomer and/or diluent discharged from the polymerization reactor; and
a polyolefin processing system configured to process polyolefin particles produced in said polymerization reactor,
wherein said means for feeding a polymerization catalyst comprises a first conduit having a catalyst inlet, the first conduit being operably connected to a pocket ball valve comprising at least one pocket, said pocket ball valve comprising an elastic member operably affixed at the bottom of said at least one pocket, said pocket ball valve being operably connected to a second conduit, said second conduit being operably connected to said polymerization reactor, and wherein said at least one pocket has a volume ranging from about 1 to about 100 cm$^3$ and wherein the first conduit and second conduit are under pressure.

\* \* \* \* \*